United States Patent [19]

Handke et al.

[11] Patent Number: 4,919,967
[45] Date of Patent: Apr. 24, 1990

[54] METHOD AND APPARATUS FOR COATING PARTS IN SERIES

[75] Inventors: Heinz Handke, Gemmrigheim; Thomas Zink, Stuttgart; Vasilios Sougioltzis, Bietigheim-Bissingen, all of Fed. Rep. of Germany

[73] Assignee: Behr Industrieanlagen GmbH & Co., Ingersheim, Fed. Rep. of Germany

[21] Appl. No.: 213,351

[22] Filed: Jun. 30, 1988

[30] Foreign Application Priority Data

Jul. 9, 1987 [DE] Fed. Rep. of Germany ....... 3722734

[51] Int. Cl.$^5$ .......................... B05D 1/04; B05D 5/02; B05D 12/08
[52] U.S. Cl. ........................................ 427/8; 118/314; 118/323; 118/631; 118/680; 118/697; 118/712; 427/33; 427/424
[58] Field of Search ............... 118/680, 697, 712, 323, 118/631, 314; 427/8, 424, 33

[56] References Cited

U.S. PATENT DOCUMENTS 4,448,821  5/1984  Buschor ........................ 118/323 X
4,770,120  9/1988  Komatsu et al. ............... 118/697 X

FOREIGN PATENT DOCUMENTS 0211372  2/1987  European Pat. Off. ............ 118/680

*Primary Examiner*—Evan Lawrence
*Attorney, Agent, or Firm*—Reising, Ethington, Barnard, Perry & Milton

[57] ABSTRACT

Coating defects are overcome which occur in the prior art as a result of positional tolerance variations between an automatic spraying device and a part, as the part, e.g., an automobile body, is transported along a conveying system into the spray booth of a coating station during a series coating operation using lacquering robots to apply paint. The distance between at least one fixed reference point on the coating apparatus and a reference point on the automobile body is measured during a preparatory coating operation and stored in the processing program of an operation controlling computer as a standard reference distance value. The reference distance is remeasured for each automobile body during subsequent series coating operations and then compared to the standard reference distance value. The processing program then corrects the movements of the lacquering robots as a function of the calculated deviation to eliminate the coating defects arising out of positional tolerance variations.

10 Claims, 2 Drawing Sheets

METHOD AND APPARATUS FOR COATING PARTS IN SERIES

TECHNICAL FIELD

The subject invention relates to a method and apparatus for serially coating parts guided along a predetermined path by a conveying device through a coating station.

BACKGROUND ART

It is well known in the automatic coating art to convey motor vehicle bodies through a spray booth where preprogramed lacquering robots or the like automatically move a spraying device relative to the body. An operation controlling computer program is usually generated using the well-known teach-in method preparatorily preformed during the coating of an initial body introduced into the spray booth for this purpose. According to prior art teaching, it is assumed that subsequent bodies are conveyed through the spray booth in the exact position, relative to the spraying device, as the initial body was during the teach-in programing operation. Therefore, efforts were made to position the subsequent vehicle bodies traveling along in the conveyor as accurately as possible relative to the spraying device.

When coating bodies according to the prior art teaching, unacceptable position tolerances could only be avoided by providing high cost conveying equipment which very accurately positioned each vehicle body for coating. For example, the cost of providing acceptable carriages, or so-called skids, for a floor mounted conveyor system or the appropriate suspension equipment for an overhead conveyor system which prevent the positional deviations causing coating defects would be inhibitive. Thus, coating defects due to positional tolerance deviations between the body and spraying device have been accepted as inevitable in this art.

SUMMARY OF THE INVENTION

The subject invention provides a method for serially coating parts moved along a predetermined path comprising the steps of moving a first part through a stationary spraying booth including an adjustable spraying device, measuring a reference distance between the spraying booth and the first part, storing the reference distance volume in a processing program for an operation controlling computer as a standard reference distance, moving the first part out of the spray booth, moving a second like part through the spray booth, remeasuring the reference distance between the spray booth and the second part, comparing positional deviations between the remeasured reference distance value in the stored standard reference distance value, and adjusting the spraying device for optimum coating of the part in response to the compared positional deviation.

Additionally, the coating apparatus is providing for serially coating parts moved along a predetermined path. The coating apparatus comprises a stationary spray booth, conveyor means for moving the parts through the spray booth along a predetermined path, at least one adjustable spraying device disposed in the spray booth and supplied with coating material for automatically depositing the coating material on the parts, and characterized by including comparator means for remeasuring a predetermined referenced distance between the part and the spray booth, and comparing positional deviations between the remeasured referenced distance and the predetermined referenced distance, and adjusting the spraying device for optimum coating of the part in response to the compared deviations.

The subject invention provides a method and apparatus especially adapted for coating motor vehicle bodies with a lacquering robot, wherein tolerance deviations in the positions of the body to be coated relative to the spraying device can be accounted for in the processing program of the operation controlling computer to provide defect-free coating. The subject invention provides this defect-free coating of bodies without requiring a manual check of the relative position between the body and the spraying device. Therefore, the precision and the expense of a high quality, high cost conveying system is not required.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
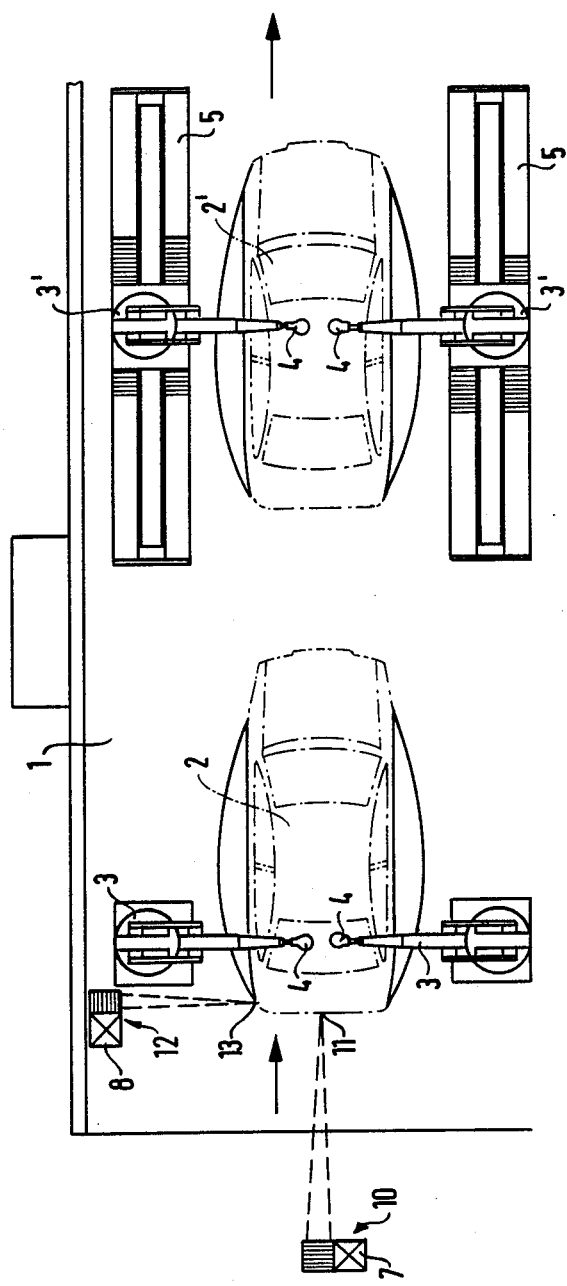
FIG. 1 is a plan view of a coating apparatus according to the subject invention.
Figure 3:
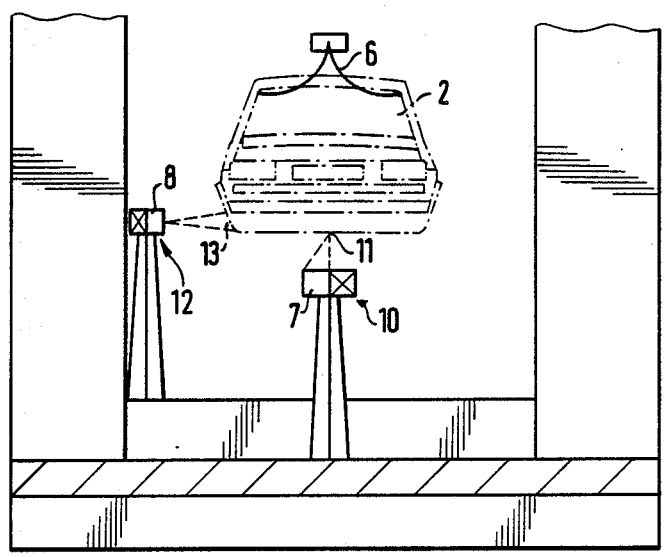
FIG. 3 is an end view of the coating apparatus of FIG. 2.

A spray booth of a coating apparatus according to the subject invention is shown at 1 in FIG. 1. Two motor vehicle bodies 2, 2' are shown in phantom positioned in the spray booth 1 for coating in a typical series coating operation. The bodies 2, 2' are moved through the spray booth 1 by a suspension conveyor 6, as shown in FIG. 3. The suspension conveyor 6 moves the vehicle bodies 2, 2' along a predetermined path through the spray booth 1 in the direction of the arrows shown in FIG. 1. The vehicle body 2 is first moved into a first coating station for a predetermined treatment period, after which the body 2 is transported to a second coating station for the same predetermined treatment period of time. Subsequently, the body 2' is moved out of the spray booth 1 and the body 2 moves from the first coating station and into the second coating station.

Predetermined surface portions of the body 2 are coated in the first coating station by two lacquering robots 3 provided with electrostatic spraying devices 4. In the preferred embodiment, the lacquering robots 3 and associated spraying devices 4 are installed in a fixed location relative to the spray booth 1. In contrast, two additional lacquering robots 3' are positioned in the second coating station and can be moved along associated rails 5 in a direction parallel to the movement of the bodies 2, 2' along the conveyor 6. As will be appreciated, other arrangements of the lacquering robots 3, 3', as well as additional coating stations, are possible. Also, it is possible to move the bodies 2, 2' through one or all of the first and second coating stations continuously, i.e., without hesitation, rather than in the above mentioned two step process.

As is well know in the art, the spraying conditions and predetermined movements of the lacquering robots 3, 3' are preprogrammed to carry out the processing program of an operation controlling computer. This preprogramming is accomplished using the teach-in method. According to the teach-in method, an initial body 2, 2' is first moved into and through the spray booth 1. The lacquering robots 3, 3' and their associated spraying devices 4 are manually controlled as they coat the body 2, 2'. The relative positions and movements of the lacquering robots 3, 3' and the associated spray devices 4 are calculated relative to a given reference position and suitably selected points on the body 2, 2' and then stored in the processing program. Additionally, the relevant variable coating parameters, e.g., the quantity of lacquer, control air, etc., are also stored in the processing program during the manual teach-in operation. Thus, a processing program prepared in the above-described manner will control the subsequent series coating operations of the vehicle bodies 2, 2'.

However, due to the inevitable positional tolerance deviations occurring in the conveying system 6, the bodies 2, 2' moved through the spray booth 1 during subsequent series coating operations will exhibit varying positional deviations from the reference positions calculated during the manual teach-in program. These positional deviations may be displacements in the lateral direction and/or in the longitudinal direction, as well as angular rotations relative to the longitudinal direction. In some cases, vertical shifts also occur.

To avoid the coating defects associated with such positional deviations, the actual position of each body 2 moved into the spray booth 1 is remeasured and compared to the reference positions originally determined during the teach-in programming. In this manner, the distance between one, and preferably at least two, fixed reference points 10, 12 and corresponding characteristic points 11, 13 on the body 2, 2' are first measured during the manual teach-in coating operation with an appropriate comparator means, or more specifically, measuring systems, 7, 8 then stored in the processing program as a standard reference distance value. The reference points 10, 12 are disposed at mutually spaced locations which are defined relative to both the positions of the lacquering robots 3, 3' and the characteristic points, or areas, 11 and 13 of the body 2.

Figure 2:
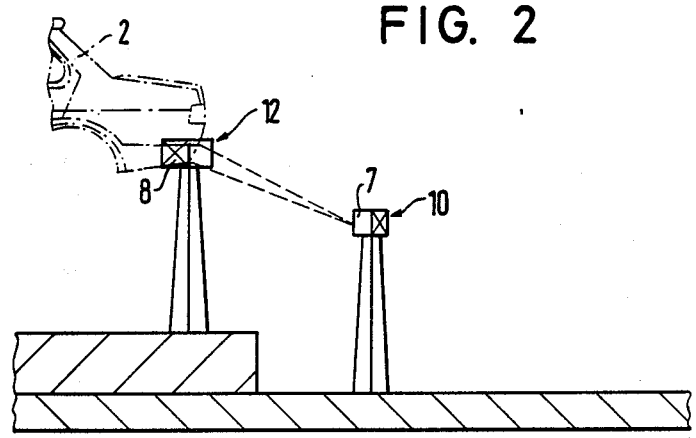
FIG. 2 is a partial side view of the coating apparatus of FIG. 1.

As shown in FIGS. 1, 2 and 3, a two dimensional measuring arrangement is provided by the two measuring systems 7 and 8. The first reference point 10 on the measuring system 7 is located slightly under the body 2 and approximately in the vertical mid-plane behind the body 2 toward the characteristic point 11 in the middle of the rear lower edge of the body 2. The direction, or path, of measurement from the reference point 10 of the measuring system 7 extends obliquely upwardly therefrom to the characteristic point 11 on the body 2. The second reference point 12 of the measuring system 8 is located laterally adjacent one of the lateral lower corners of the body 2, and the direction of measurement extends at a right angle from the reference point 12 to the corner of the vehicle body 2.

In the preferred embodiment, the first and second reference distance measurements extend in a path perpendicular to the direction of movement of the vehicle bodies 2, 2' along the conveyor 6, and simultaneously parallel to the direction of movement. However, the reference direction measurements are essentially selected arbitrarily and merely as a function of the actual practical conditions. It is also possible to measure the reference distance between the two reference points 10, 12 and a single common characteristic point on the body 2. Alternatively, depending upon the practical conditions and the possible positional deviation, it may be advantageous to employ more than the two measuring systems 7, 8 shown.

Typically, the vertical position of the body 2 can be assumed to be constant, and thus correspond to the original vertical component condition stored during the preparatory teach-in programming operation. However, it may be necessary in some cases to determine the positional deviations not only in two dimensions, but also in three, and to take these three dimensional position deviations into account during the processing program control.

Remeasurements of the reference distance are repeated each time a new body 2 is transported into the spray booth 1. The reference distance values thus remeasured are compared to the originally stored standard reference distance values, and an accurate position of the robots 3, 3' relative to the body 2, 2' can be computed from the calculated deviations in a computer (not shown) connected to the measuring systems 7, 8. According to generally known rules of calculations, the deviations between remeasured and reference distance values can be determined even if the measuring directions are different from those shown in FIGS. 1, 2 and 3. If desired, one computer may be provided for each measuring system 7, 8 and/or each coating station in a modular system.

To improve the accuracy of the calculated positional deviations from the standard reference distance, it may be advantageous to perform several remeasurements to determine the positional deviation from the standard reference distance value and then calculate a mean value from the several reference distance remeasurements. This may be performed by a plurality of remeasurements repeated in a very short time by the same measuring systems 7, 8 and/or using a plurality of measuring systems disposed at many different locations.

Based on the positional deviations determined after remeasuring the reference distance, the working programs governing the movements of the robots 3, 3' are recalibrated so that the coating conditions achieved during the manual teach-in coating process will again be obtained for each subsequent body 2 during the following series coating operations. In many cases, it is most advantageous to control the movements of the robots 3, 3' so that the original distances between the bodies 2, 2' and each of the spraying devices 4 will be maintained. Since, as a practical matter, the conveyor system 6 can not be made to correct for the positional deviations, the lacquering robots 3, 3' are corrected from their reference positions to account for the instantaneous errors. This is automatically accomplished in the known manner by an electronic control system governed on data supplied by the measuring systems 7, 8 or their associated computers. The robots 3, 3' can thus be positionally directed by adjusting the robot movement program of the processing program prior to emitting coating material from the spraying device 4. In particularly, it is possible to store a plurality of different movement programs for the lacquering robots 3, 3' of the processing program into which all of the foreseeable positional tolerance deviations of the bodies 2, 2' are accounted for and stored in the memory of the operation controlling computer. Thus, based on the positional error determined during remeasurement of the reference distance values, the corresponding program is selected and implemented as a movement program for the lacquering robots 3, 3' by the robot control unit. The movement path of the robots 3, 3' is to be determined prior to the start of the processing program, because on-line change is usually impossible or sufficiently impractical.

In the alternative, instead of adjusting the movement program of the lacquering robots 3, 3' in response to the positional deviation, it is also possible under certain circumstances to automatically adjust only the coating parameters, e.g., to an excessively great or excessively short distance from the body 2, 2'.

The standard reference distance and the remeasured reference distance are preferably measured with a transmitting and receiving means which measures the time between the emission and reception of a signal reflected by the body 2. Pulsed laser distance measuring systems, mounted at the reference points 10 and 12 in fixed positions relative the base of the lacquering robot 3 or to the guide rails 5 of the robot 3', are preferred for this purpose. Such pulsed laser measuring systems, which measure the time elapsing between the transmission and the echoreturn according to the principal of radar, are well known in the prior art. As mentioned previously, the subject invention is not limited to the measuring arrangement set forth in the preferred embodiment operating two dimensionally in mutually perpendicular directions (x, y).

The subject invention is also advantageous for coating apparatuses operating in conjunction with a floor-mounted conveyor, because the movement path of the conveyor may be considered constant, while the position of the bodies 2, 2' on their associated skids can not.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for serially coating parts moved along a predetermined path in a stationary spray booth including an adjustable spraying device, the method comprising the steps of: moving a first part through the spray booth; measuring the distance between a point in the spray booth and a point on the first part to establish a first reference distance; storing the first reference distance value in a processing program of an operation controlling a computer as a standard first reference distance; moving the first part out of the spray booth; moving a second like part through the spray booth (1); remeasuring the first reference distance between the point in the spray booth and the point on the second part by measuring the time lapse between the emission and reception of a signal reflected by the second part; comparing positional deviations between the remeasured first reference distance value and the stored first reference value; and adjusting the spraying device for optimum coating of the part in response to the compared positional deviations.

2. A method as set forth in claim 1 further characterized by measuring the first reference distance between the point in the spray booth and the point on first part prior to coating the first part.

3. A method as set forth in claim 1 further characterized by storing a predetermined number of processing programs in the operation controlling computer prior to coating the first part, and implementing one of the predetermined processing programs after comparing the positional deviations between the remeasured first reference distance value and the stored standard first reference distance value.

4. A method as set forth in claim 1 further characterized by measuring a second reference distance between a point in the spray booth and a point on the first part; storing the second reference distance value in a processing program for the operation controlling computer as a standard second reference distance, remeasuring the second reference distance between the point in the spray booth and the point on the second part; comparing the positional deviations between the remeasured second reference distance value and the stored standard second reference distance value; and adjusting the spray device for optimum coating of the part in response to the compared positional deviations.

5. A method as set forth in claim 4 further characterized by measuring the second reference distance in a path at a right angle to the direction of movement of the parts along a conveyor and measuring the first reference distance along a path in a plane generally parallel to the direction of movement.

6. A method as set forth in claim 1 further characterized by remeasuring the reference distances a plurality of times in rapid succession, storing the plurality of reference distance values, and calculating a mean reference distance value for adjusting the spraying device.

7. A method as set forth in claim 5 further characterized by measuring the first and second reference distances using a transmitting and receiving device which determines the time lapse between the emission and the reception of a signal reflected by the part.

8. A coating apparatus for serially coating parts moved along a predetermined path, said apparatus comprising: a stationary spray booth; conveyor means for moving a part through said spray booth along a predetermined path; at least one adjustable spraying device disposed in said spray booth and supplied with coating material for automatically depositing the coating material on the part; means for establishing a predetermined reference distance between a point on a first part and a point in said spray booth; and characterized by including comparator means for remeasuring said predetermined reference distance between a second and successive parts and said spray booth by measuring the time lapse between the emission and reception of a signal reflected by the second and each successive part and comparing positional deviations between said remeasured reference distance and said predetermined reference distance, and adjusting said spraying device for optimum coating of the second and each successive part in response to said deviations.

9. An apparatus as set forth in claim 8 further characterized by said comparator means including at least one pulsed laser distance measuring system for emitting a light signal to remeasure said reference distance between said spray booth and the parts.

10. An apparatus as set forth in claim 9 further characterized by at least two of said pulsed laser distance measuring systems mounted at mutually spaced locations in said coating station.

* * * * *